Figure 1:
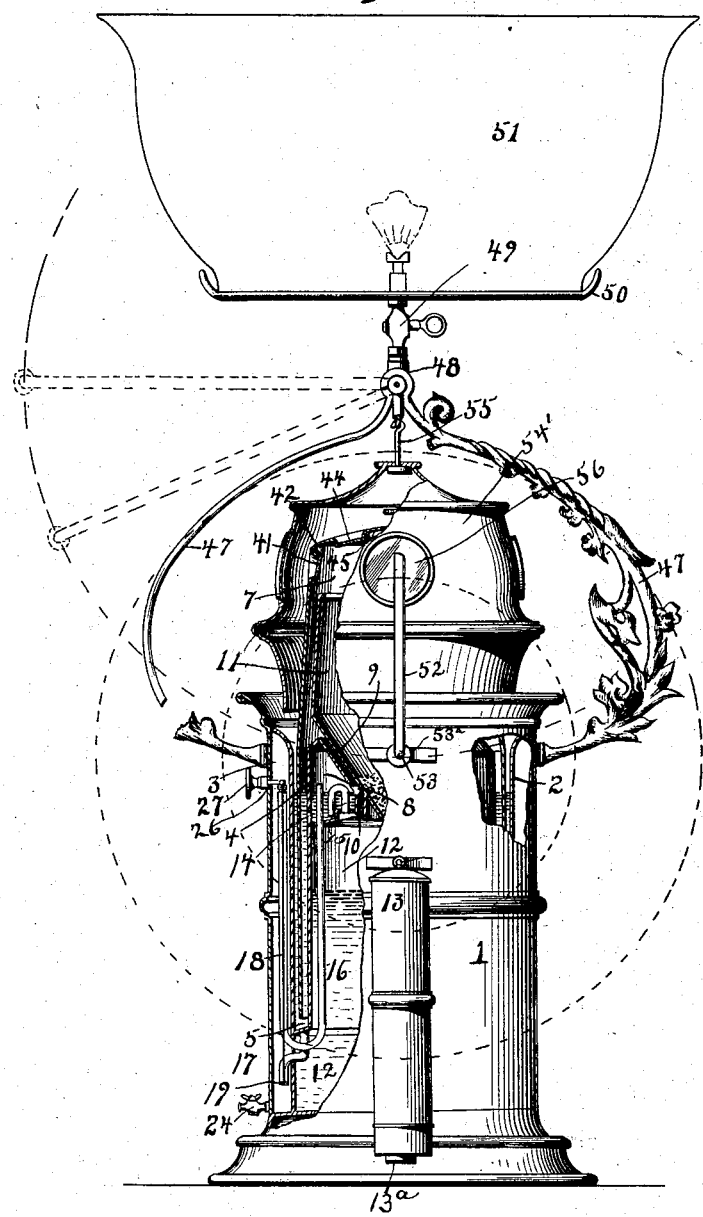

No. 721,675. PATENTED MAR. 3, 1903.
J. DE DIOS TEJADA.
ACETYLENE GAS GENERATOR OR LAMP.
APPLICATION FILED JAN. 31, 1902.
NO MODEL. 3 SHEETS—SHEET 1.

No. 721,675. PATENTED MAR. 3, 1903.
J. DE DIOS TEJADA.
ACETYLENE GAS GENERATOR OR LAMP.
APPLICATION FILED JAN. 31, 1902.
NO MODEL. 3 SHEETS—SHEET 2.
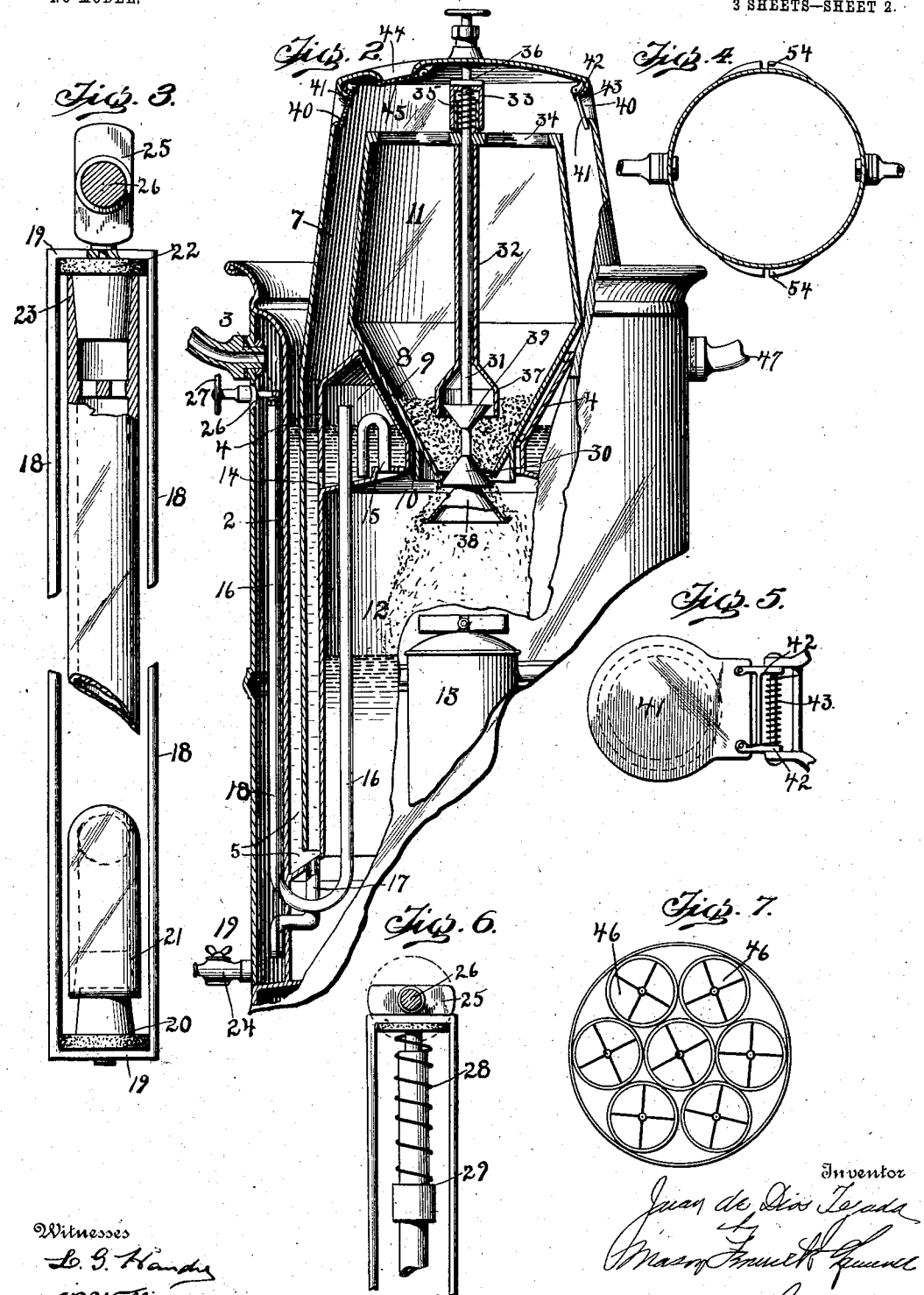

No. 721,675. PATENTED MAR. 3, 1903.
J. DE DIOS TEJADA.
ACETYLENE GAS GENERATOR OR LAMP.
APPLICATION FILED JAN. 31, 1902.
NO MODEL. 3 SHEETS—SHEET 3.
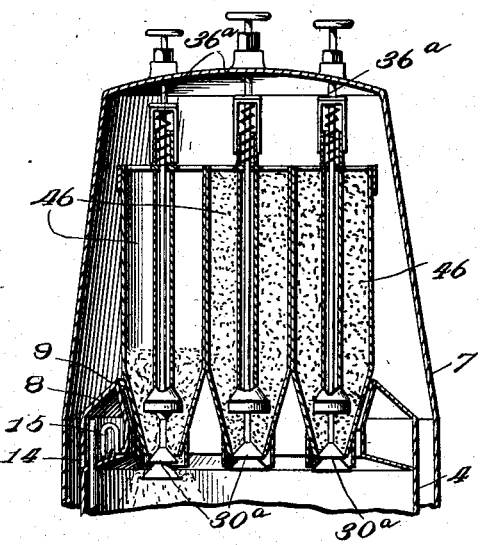
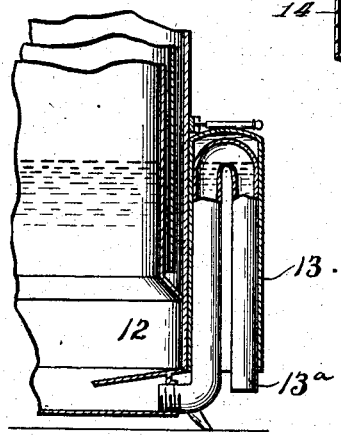
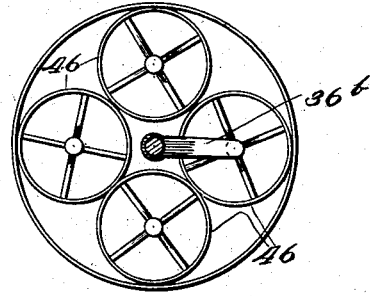

UNITED STATES PATENT OFFICE.

JUAN DE DIOS TEJADA, OF HAVANA, CUBA.

ACETYLENE-GAS GENERATOR OR LAMP.

SPECIFICATION forming part of Letters Patent No. 721,675, dated March 3, 1903.

Application filed January 31, 1902. Serial No. 92,027. (No model.)

*To all whom it may concern:*

Be it known that I, JUAN DE DIOS TEJADA, a citizen of the United States, residing at Havana, Cuba, have invented certain new and useful Improvements in Gas-Generators and Portable Lamps; and I do hereby declare the following to be a full, clear, and exact description of the invention, such as will enable others skilled in the art to which it appertains to make and use the same.

This invention relates to improvements in gas-generators and portable lamps; and it consists in a generating mechanism and lamp having an inclosing shell, a gas-chamber within said shell, a water seal inside said chamber, a gas-holder in said seal, means for bringing calcium carbid in contact with water for generating acetylene gas, and means for washing the gas before passing it to the burner of the lamp or elsewhere.

It consists in certain other novel constructions, mechanisms, and arrangements of parts, as will be hereinafter fully described and claimed.

In the accompanying drawings, Figure 1 represents a side elevation of my improved generator and portable lamp, portions being broken away and shown in section to better reveal the construction of the mechanism. Fig. 2 is an enlarged detail view, partially in elevation and partially in section, of my improved generator, showing the internal construction thereof. Fig. 3 is a detail view showing the valve mechanism applied for controlling the flow of gas from the generator. Fig. 4 is a detail cross-section through the outer shell or casing of the generator, illustrating the manner in which the burner of the lamp is pivotally connected to said shell and showing the means for locking the same in its normal position. Fig. 5 is a detail view showing one of the gates or glass doors for permitting the inspection of the interior of the gas-holder. Fig. 6 is a detail view of a portion of the gas-outlet pipe, showing the valve for closing the same and the cam for operating it. Fig. 7 is a horizontal sectional view through a carbid-charging mechanism provided with a number of charging-compartments. Fig. 8 is a detail sectional view through the upper portion of the gas-holder, showing the arrangement of the carbid-holders when a number of them are employed. Fig. 9 is a top plan view of a similar construction, but showing a radiating arm for operating the valve-stem of said carbid-holders. Fig. 10 represents a detail fragmentary sectional view illustrating the siphon and its connections.

My improved generator and lamp mechanism is constructed so that the gas generated therein may be brought in contact with a large area of water, so as to tend to cool the gas rapidly after being generated, the said gas being also forced to pass through the water, so that it will be thoroughly washed and cleansed, having every vestige of lime, which it usually carries with it after being generated, removed therefrom before it passes through the generator to the burners or system of piping used to convey it to various points for use. The generating mechanism is also constructed so that when it is necessary to recharge the same with a fresh supply of carbid the pressure upon the outgoing gas may be maintained while the recharging operation is carried on. Thus burners or other devices which are being supplied with gas will not be disturbed while the recharging operation is being performed.

In embodying the invention in a practical apparatus I use an outer shell or casing 1 of suitable diameter, arranging within the same an inner shell or casing 2, which forms with the outer shell an annular gas-holding chamber 3. Within the casing 2 is arranged still another shell, 4, which is joined at its lower edge to the shell 2, forming therewith an annular chamber 5 for the reception of water to form a water seal. An inverted open-end casing or bell 7 is inserted at its lower end in the water seal, forming a gas-holder which will accommodate itself to the pressure of the gas generated and will exert a constant pressure by its weight upon the gas for forcing it out of the generator to points of use.

At the upper edge of the inner casing 4 and within the same is formed an annular water-chamber 8, the said water-chamber being inclosed on all sides. This chamber is formed with funnel-shaped walls 9, which lead to a central aperture or opening 10. This aperture is of suitable diameter to receive the lower end of a carbid-holder 11, which is also funnel-shaped at its lower portion, so as to rest against the funnel-shaped walls 9 of the water-chamber 8. The discharging-mouth of the carbid-holder 11 projects through the aperture 10 and is arranged to drop carbid from its lower end into the bottom chamber of the generator. This chamber 12 is filled with water to a suitable height for generating in connection with the carbid the gas which is to be delivered from the apparatus. The water in the chamber 12 is maintained at a suitable height by means of a siphon 13 of suitable construction, this siphon also serving to clean out the residue from the chamber 12. This siphon mechanism comprises an outer casing and an inner siphon-tube 13$^a$, which is connected at its inner end with the bottom of the water-chamber 12, while its outer end is open and projects slightly below the inclosing casing, as shown in Fig. 1. This siphon is pivotally connected to the generator, so that it may be turned downwardly for starting a flow of water through it and may also be quickly turned upwardly again for starting the siphonic action in draining the water-chamber. The annular water-chamber 8 is formed with one or more openings, preferably arranged in the shell 4, as at 14, so that the said water-chamber is in communication with the water seal 5. The bottom or floor of the water-chamber 8 is preferably inclined from its inner edge toward its outer edge, so that any sediment which may collect in said water-chamber will be discharged through the opening 14 into the water seal. The upper edge of the outer casing 1, as well as of the inner casing 2, is made so as to flare downwardly, as clearly illustrated in Figs. 1 and 2 of the drawings, so that water can be easily introduced into the water seal from the upper edge of the casing. As the water enters the water seal it will rise therein and will finally pass through the opening 14 of the inner shell 4 and fill the annular water-chamber 8 to a suitable height. The height of the water in this chamber, as well as that of the water seal, is regulated by a U-shaped pipe 15, which is arranged in said water-chamber 8, the long leg of which has its end extending to a point in comparatively close proximity to the floor or bottom of said chamber, while the other or short leg has its end passed through the said bottom or floor of the gas-generating chamber beneath. As the water rises in the water-chamber 8 it will enter the long leg of the U-shaped pipe 15, and when it reaches the bent portion thereof it will run out through the descending or short leg of the said pipe and be delivered into the water or generating chamber 12, the said pipe being prevented from siphoning by the relative positions of its legs. It will thus be seen that by introducing water to the apparatus at one point from the upper edge of the outer casing water will be supplied to the water seal, to the inner water-chamber 8, and to the generating water-chamber 12, the proper level in all these compartments being automatically maintained. A gas delivery or discharge pipe 16 leads from the upper part of the annular water-chamber 8 down through the floor thereof and through the gas-generating chamber 12 to a point near the lower end of the casing, whence it passes through the inner shell 2 into the annular gas-delivery chamber 3, passing upwardly in the same to a point near the top thereof. The gas in order to make its way from the generating-chamber and gas-holder to the delivery-pipe 16 has to force its way through a portion of the water in the water seal and in the water-chamber 8. The gas which is in the holder 7 will when the pressure is sufficient pass downwardly through the water in the water seal to the aperture 14 and thence upwardly through the water in the water-chamber 8 to the upper portion of said chamber, where it will gain free access to the inner end of the delivery-pipe 16. Some of the gas, however, will force its way through the U-shaped pipe 15 into the water in the water-chamber 8, rising through the same to the upper portion of the said chamber 8 and thence passing out through the pipe 16. It will thus be seen that the only access which the gas has to the outlet-pipe 16 is through the water of the water seal and chamber 8. In this way any small quantities of fine lime which the gas carries with it when first generated will be washed or removed therefrom, being collected in the said water-chamber 8 or in the water seal 5.

Of course it will be understood that the lime carried by the gas is in very small quantities; but experience has shown that a sufficient amount of such lime is present in the gas when unwashed to clog the piping or burners through which such gas passes after they have been used awhile.

In order to maintain a continuous pressure upon the outgoing gas at all times, and especially when new carbid is being introduced into the carbid-holder, I have provided an apparatus with means for introducing water into the bottom of the gas-chamber 3 while the recharging operation is in progress. This means comprises a short angular pipe 17, which extends from the bottom of the water seal 5, through the shell 2, into the gas-chamber 3. The lower end of this pipe 17 extends downwardly in an opposite direction to the upper end of the pipe 16, the ends of the two pipes being arranged so as to have coinciding axes. A valve mechanism is used to control the ends of these pipes 16 and 17, which are in the gas-chamber 3. Such a controlling mechanism consists of a link or loop of any suitable material, as 18, having ends or cross-bars 19, which are adapted to extend across the open ends of the pipes 16 and 17. A valve, as 20, is carried by the lower end of this link 18 and is adapted to engage a valve-seat 21, formed at the lower end of the pipe 17, when the link 18 is raised. The upper end of the said link carries a valve, as 22, which engages a valve-seat 23, formed in the end of the pipe 16. The position of the link 18 is normally such that the valve 20 will close the lower end of the pipe 17, preventing water from flowing into the gas-chamber 3 from the water-seal 5. When the link is in this position, the valve 22 will be unseated at the outer end of the pipe 16, and the gas will be free to flow from said pipe into the gas-chamber 3. When a new charge of carbid is to be inserted in the apparatus, the link 18 is forced downwardly, so as to seat the valve 22 and close the pipe 16, the said link at the same time unseating the valve 20 and permitting water to flow through the pipe 17 from the water-seal 5 into the gas-chamber 3. The water thus entering the said gas-chamber 3 will displace a portion of and maintain a constant pressure upon the gas which is in said chamber 3 and will thus keep up a steady flow of gas from the generator to the burners or other mechanisms which are being supplied with the said gas.

The operation of recharging the mechanism with carbid is only a short one; but the time in which pressure may be maintained upon the gas in the chamber 3 by the entering of the water in the lower end of said chamber is more than ample to allow for such an operation. When the recharging of the apparatus with carbid has been accomplished, some of the carbid is immediately dropped into the generating-chamber 12, so that the holder 7 may be quickly refilled with gas. The link 18 is then raised, so as to close the lower end of the pipe 17 and open the end of the pipe 16. The water which has been introduced into the annular gas-chamber 3 is then withdrawn therefrom through a draw-off cock 24 at the bottom of the said chamber. The gas from the generating-chamber will then continue its normal passage through the apparatus. In order to operate the link 18, I preferably employ a cam 25, which is carried by the inner end of a rod 26. The rod 26 extends through a suitably-packed bearing in the outer shell or casing 1, its inner end, which carries the cam 25, being immediately above the link 18, while its outer end is provided with a hand-wheel or other operating device, as 27, by which the said rod and cam may be turned. The cam 25 may be formed of an elongated piece of metal, as clearly illustrated in Figs. 3 and 6, so that when the said cam is turned to its vertical position, as shown in Fig. 3, the link 18 will be forced to its lowest position. When the cam is turned into its horizontal position, as shown in Fig. 6, the link 18 will be free to rise again under the action of a spring, as 28, which surrounds the upper end of the pipe 16, engaging an annular shoulder 29, formed thereon, and pressing against the upper cross-bar of the link 18. It will thus be apparent that the manipulation of the link 18 is simple and easily accomplished from the outside of the generator.

The carbid-holder is preferably open at its upper end and is formed with a valve mechanism which projects through the center of said holder to the lower discharge end thereof. This mechanism consists of a valve 30, adapted to close the outlet-opening at the bottom of the said holder, the said valve being preferably conical in shape and secured to a valve-stem 31. The valve-stem passes upwardly through a shield or casing 32 and is provided with a cup 33 at its upper end, between which and a spider 34 at the top of the carbid-holder is interposed a spring 35 for holding the said valve-stem normally in its raised position. The valve-stem 31 is adapted to be forced downwardly for opening the valve 30 and starting the discharge of the carbid from the holder by a screw-rod 36, which enters the top of the gas-holder 7 and can be controlled from without the shield 32. The casing 32 is preferably considerably flared at its lower end, as at 37, so as to prevent too great a weight of carbid from resting upon the valve 30. The lower end of the rod 30 also carries a carbid-spreader 38, which is preferably conical in shape and is larger than the valve 30. This spreader 38 not only spreads the carbid falling from the holder and distributes it more evenly on the surface of the water in the chamber 12, but prevents the water from being splashed, so as to enter the bottom of the carbid-holder and causing trouble at this point. The lower wide portion of the said spreader 38 is preferably curved upwardly, as illustrated in Fig. 2. The valve-stem 31 also carries a safety-valve 39, which is arranged above the valve 30, being ordinarily located within the flared portion of the shield 32. This valve 30 is in the form of a hollow inverted cone and is employed for the purpose of preventing the carbid from running through into the generating-chamber if anything should happen to the spring 35 or the valve-rod or any other part of the valve mechanism whereby the valve 30 would lose its controlling-power over the discharge of the carbid. It will be readily seen that should the spring 35 be broken, so as to permit the valve-rod 32 to drop below its normal position, the inverted valve 39 would arrest the descent of the said rod at the mouth of the carbid-holder and the discharge of the carbid would be arrested until the difficulty could be remedied.

The gas-holder 7 is formed with suitably-placed sight-openings, as at 40, preferably arranged in the sides of said holder near its upper end. These openings 40 are preferably closed by hinged gates or doors 41, which may be formed of glass or other transparent material. These doors 41 are hinged to the holder 7 by means of hinges 42, which are spring-pressed, the springs 43, surrounding the pivot-pins of said doors, tending to force against the openings 40 for closing them. The pressure of the gas inside the holder 7 also tends to hold the said doors in their closed position. One or more apertures 44 is also provided in the top of the gas-holder 7, so that a funnel may be introduced through the same for directing carbid into the top of the carbid-holder. This aperture is preferably closed by a gate or door 45, mounted like the doors 41, just described. When it is desired to introduce carbid, it is only necessary to force the funnel through the opening and press the door 45 back out of the way, and after the charging has been finished and the funnel removed the said door will automatically close again.

For generators of ordinary size and for portable lamps it is quite sufficient to have one carbid-holder. When, however, it is desired to greatly increase the capacity of the machine and it is made upon a much larger scale, a series of carbid holders or compartments are employed. As illustrated in Figs. 7 and 8, the carbid-charging apparatus may be formed with a number of carbid-compartments, as 46 46, arranged within the walls of the carbid-discharging mechanism. Where a carbid-charging mechanism with a number of compartments is used, each compartment is provided with a discharge-valve $30^a$, and a starting-screw $36^a$, similar to the screw 36, is arranged over each of the said compartments. While this is a preferable arrangement, I may employ a single mechanism, such as a radiating-arm $36^b$, for operating each of the discharge-valves, the said radiating-arm being adapted to be turned about the axis of the rod which carries it, so as to be brought successively over the ends of the discharge-valves.

When using the apparatus as a lamp, the gas is taken from the upper portion of the gas-chamber 3 through one or more arms or pipes 47, which preferably extend upwardly above the upper end of the generator and meet at a common point 48, above which is secured a burner 49 of ordinary construction. The burner may be provided with a globe-holder 50 and a globe 51 of any suitable form or design. The pipes 47 are preferably ornamented with any design for producing a pretty effect, or the pipes may be left plain, if preferred. The pipes 47 are connected with the casing 1 in such a manner that they may be swung to one side or the other of a vertical plane passing through their points of juncture with the said casing. These pivotal connections are preferably packed, so that there will be no leakage of gas at the points where these pipes are pivoted to the said connection, and the joints of these pipes may be kept tight by means of the clamping action of the pipes themselves. The pipes 47 may be both hollow and adapted to conduct gas, or one of them may be merely a dummy. They are arranged diametrically opposite to each other, so that the burner can be turned downwardly upon one side or the other of the apparatus for getting at the top thereof to recharge the same. In order to hold the piping 47 in its normal vertical position, I arrange dummies similar thereto, as 52, in planes at right angles to the pipes 47, these dummies being pivoted at the point 48, where the pipes come together below the burner 49. The lower ends of the dummies 52 carry spring-latches 53 of any suitable structure, which are adapted to engage notched projections 54 upon the opposite sides of the casing 1, as clearly shown in Fig. 4 of the drawings. When the lamp is in its normal position, the pipes 47 are vertical, and the dummies 52 are swung downwardly, so as to engage the notched projections $53^a$ and hold the lamp-burner securely in position. When it is desired to turn the lamp down again from one side to the other, the dummies 52 are released from their engagement with the notched projections $53^a$ and are swung upwardly, as illustrated in dotted lines in Fig. 1, when the said pipes and burner can be moved to one side or the other without putting out the light when said burner is being used, and the gas-pressure will be maintained the same in the chamber 3 by the introduction of water into the bottom thereof, as heretofore set forth.

To further add to the neat and artistic appearance of the mechanism when used as a lamp, I suspend an ornamental bell 54' beneath the burner 49, so as to inclose the upper end of the gas-holder 7. This bell is suspended loosely upon the end of a hooked rod 55, so that in case the holder 7 should rise to an unusual height under an excessive pressure of gas the bell 54' can move upwardly therewith. It is, however, suspended at a sufficient height to accommodate the normal movements of the said gas-holder 7. The bell 54' may be made entirely of glass, if desired, or other transparent material; but the same purpose can be accomplished by inserting large glazed sight-holes, as 56, in the sides thereof opposite the sight-holes 40 in the gas-holder 7.

If it is not desired to use the device as a lamp, the piping 47 may be left off and the gas generated may be led through other piping to any suitable place for use. It will be understood that gas developed by such a generator is not only capable of use for illuminating purposes, but is also used for heating purposes by the admission of a proper quantity of air, as in gas-stoves, Bunsen burners, and the like. Such gas is also used for power-developing purposes in modified or slightly-altered gas-engines.

From the above description it will be seen that I have provided a device which, though quite simple in structure, is capable of important functions in the generating and handling of acetylene gas and that a gas of great purity can be supplied.

It will be apparent that sediment collecting in the water-chamber 8 will be washed out of the same into the water seal 5 and that any collection of sediment in the water seal will be removed through the pipe 17 when the water is introduced into the bottom of the gas-chamber 3. The gas-chamber 3 will be kept clear of sediment by the forcing of water through the draw-off cock 24 after the recharging operation has been completed.

The gas will ordinarily find ample room for escape between the walls of the water-chamber 8 and the carbid-holder 11 into the gas-holder 7. However, I sometimes form the surface of these parts with grooves or corrugations, so that passages are thus formed between the carbid-holder and the water-chamber leading into the gas-holder. However, there is always a chance, as above shown, for gas to pass through the tube 15, so as to get into the water-chamber 8 and find its way out the pipe 16.

Having fully described my invention, what I claim as new, and desire to secure by Letters Patent, is—

1. A gas generator or lamp, comprising a casing having an outer annular gas-chamber, a water-chamber arranged interiorly of the casing, a pipe leading from the same into the annular gas-chamber, and means for admitting water into the gas-chamber for maintaining constant pressure upon the gas when the apparatus is interrupted in its production of gas for recharging it with carbid, substantially as described.

2. A gas generator or lamp, comprising a casing formed with an outer inclosing gas-chamber, a water-chamber arranged within the same, a generating-chamber below the water-chamber and also within the gas-chamber, a gas-outlet pipe leading from the water-chamber to the gas-chamber, means for leading the gas so that it will be forced to pass through a portion of the water in order to reach the said outlet-pipe and pass to the said gas-chamber, the parts being constructed to obtain a thorough washing of the gas to remove lime therefrom, substantially as described.

3. A gas-generator, comprising a casing having two inner rigid concentric shells, a gas-chamber being formed between the outer casing and the next shell, while a water seal is arranged between the two inner shells, an inner water-chamber supported by the inner shell, a generating-chamber inside the inner shell, means for conducting the gas formed in the generating-chamber to the gas-chamber between the outer shells, a gas-holder operating in the water seal, and means for supplying carbid to the generating-chamber, substantially as described.

4. A gas-generator, comprising a casing formed with an outer gas-chamber, a water seal arranged inside the gas-chamber, a gas-holder extending into said water seal, a gas-outlet pipe leading from the interior of the generator into the outer gas-chamber, a pipe leading from the water seal into said gas-chamber, and means for opening or closing the ends of the gas-outlet pipe and the water-pipe which extend into the gas-chamber, the means for closing the end of the water-pipe being constructed to permit water to enter the gas-chamber from the water seal so as to exert a constant pressure upon the gas in said chamber when the fresh gas is not being generated in the apparatus, substantially as described.

5. A gas-generator, comprising a casing formed with an outer annular gas-chamber, a water seal interposed between it and the gas-generating chamber, an annular water-passage arranged above the generating-chamber of the apparatus, means for maintaining a proper level of water in the water seal and water-chamber, a means for leading water from the water seal into the bottom of the gas-chamber to exert a pressure upon the gas therein when the apparatus has ceased producing gas while fresh carbid is being introduced, and means for controlling the outlet of the gas from the generator, substantially as described.

6. A gas-generator, formed with a gas-chamber, in its outer periphery, a gas-generating chamber, in the bottom thereof, a water seal between the generating-chamber and the outer gas-chamber, an annular closed water-chamber arranged inside the water seal and above the generating-chamber, the said annular water-chamber communicating with the water seal through one or more passages, an inverted-U-shaped pipe leading from the annular water-chamber into the gas-generating chamber, so that water which is introduced into the water seal will also fill the annular water-chamber and overflow into the generating-chamber, the said U-shaped pipe automatically maintaining a proper water-level in the water seal, and in the inner annular water-chamber at all times, and means for maintaining a proper water-level in the generating-chamber, substantially as described.

7. A gas-generator formed with a gas-distributing chamber, a gas-generating chamber, a gas-holder, a water seal therein, a pipe for delivering the gas generated, into the gas-distributing chamber, a pipe for delivering water from the water seal into the said gas-distributing chamber, the ends of the two pipes being arranged with their axes upon the same line, a link carrying valves for closing the ends of these pipes, means for moving the link in one direction to close the water-pipe and open the gas-pipe, and means for moving the link in the other direction to close the gas-pipe and open the water-pipe, substantially as described.

8. A gas-generator, having a gas-distributing chamber, and a gas-generating chamber therein, a pipe for leading the gas from the interior of the generator into the distributing-chamber, a water seal inside the casing, a gas-holder extending into the same, a pipe for leading water from the seal into the outer gas-chamber, the ends of the gas-pipe and the water-pipe extending in opposite directions with their axes coinciding, a link inclosing the ends of said pipes, a valve carried by each end of the link and adapted to close the pipes alternately, the length of the link being such that when one of the valves is seated, the other will be unseated and vice versa, a cam bearing against one end of the link, a handle extending outside the casing for operating the said cam when brought to a vertical position forcing the link downwardly and closing the gas-pipe and at the same time opening the water-pipe, and when brought into a horizontal position permitting the link to rise again for closing the water-pipe and opening the gas-pipe, and a spring for normally holding the link in its upper position, substantially as described.

9. A gas-generator, comprising a casing having a generating-chamber formed therein, a gas-holder working above said gas-generating chamber, a carbid-charging mechanism comprising a casing arranged above the generating-chamber, and a series of carbid-compartments within said casing, a series of spring-controlled valves for controlling the outlets of each compartment, and means for depressing the valves to start the operation of the generator, substantially as described.

10. A gas-generator, formed with a gas-chamber, in its outer periphery, a gas-generating chamber in the bottom thereof, a water seal between the generating-chamber and the outer generating-chamber, an annular closed water-chamber arranged inside the water seal and above the generating-chamber, the said annular water-chamber communicating with the water seal through one or more passages, an inverted-U-shaped pipe leading from the annular water-chamber into the gas-generating chamber and formed with a long and a short leg, the short leg thereof communicating with the gas-generating chamber and the long leg with said annular water-chamber, so that water which is introduced into the water seal will also fill the annular water-chamber and overflow into the generating-chamber, the said U-shaped pipe automatically maintaining a proper water-level in the water seal, and in the inner annular water-chamber at all times, and means for maintaining a proper water-level in the generating-chamber, substantially as described.

In testimony whereof I hereunto affix my signature in presence of two witnesses.

JUAN DE DIOS TEJADA.

Witnesses:
 JOSÉ ABELEIRA CARRIL,
 JOSÉ F. FUENTE.